United States Patent [19]
Yoshizawa

[11] Patent Number: 5,204,152
[45] Date of Patent: Apr. 20, 1993

[54] OPTICAL RECORDING MEDIUM
[75] Inventor: Atsushi Yoshizawa, Saitama, Japan
[73] Assignee: Pioneer Electronic Corporation, Tokyo, Japan
[21] Appl. No.: 862,311
[22] Filed: Apr. 2, 1992
[30] Foreign Application Priority Data
Aug. 20, 1991 [JP] Japan .................................. 3-208005
[51] Int. Cl.$^5$ .............................................. B32B 3/00
[52] U.S. Cl. .................................. 428/64; 428/65; 428/195; 428/411.1; 428/457; 428/913; 430/945; 346/76 L; 346/135.1
[58] Field of Search ............... 428/64, 65, 195, 411.1, 428/457, 913; 430/945; 346/76 L, 135.1

[56] References Cited
U.S. PATENT DOCUMENTS

| 4,335,173 | 6/1982 | Caraballo | 428/65 |
| 4,510,508 | 4/1985 | Janssen | 346/135.1 |
| 4,752,554 | 6/1988 | Sato et al. | 430/273 |
| 4,839,883 | 6/1989 | Nagata et al. | 369/286 |

Primary Examiner—Patrick J. Ryan
Assistant Examiner—Elizabeth Evans
Attorney, Agent, or Firm—Sughrue, Mion, Zinn, Macpeak & Seas

[57] ABSTRACT

An optical recording medium, comprising: a light transparent substrate, a light absorbing layer disposed on the light transparent substrate, a light reflection layer disposed on the light absorbing layer, and a protection layer disposed on the light reflection layer, wherein a cushion material layer is disposed at least above the light reflection layer by the medium of the protection layer, and a protection plate is disposed on the cushion material layer.

In the optical recording medium having the above structure, the protection layer may be prevented from being peeled or separated from the other layer constituting the optical recording medium even when an external force is applied thereto, whereby the light absorbing layer and the light reflection layer are stably protected from such an external force.

18 Claims, 1 Drawing Sheet

OPTICAL RECORDING MEDIUM

FIELD OF THE INVENTION

The present invention relates to a writable optical recording medium, and particularly to an optical recording medium which comprises a substrate having a light transmission and a light absorbing layer and a light reflection layer disposed on the light transparent substrate.

BACKGROUND OF TUE INVENTION

As a so-called writable optical recording medium, there has been known an optical recording medium which comprises a transparent substrate, a light absorbing layer comprising an organic coloring matter (or colorant) such as a cyanine type and a phthalocyanine type, a light reflection layer formed on the light absorbing layer, and a protection layer disposed on the light reflection layer for preventing the deterioration or scratch which can occur in the light absorbing layer and/or the light reflection layer. In the optical recording medium having such a structure, a laser light (or laser beam) is supplied thereto from the transparent substrate side thereof and the laser light is concentrated (or focused) on a minute area of the light absorbing layer so that it is converted into heat energy. As a result, the thus irradiated portion of the light absorbing layer is caused to have a different state or configuration (e.g., a pit is formed in such a portion), thereby to effect writing. On the other hand, a laser light (or laser beam) for reading is supplied to such an optical recording medium from the transparent substrate side thereof and is reflected by the light reflection layer. At this time, the resultant contrast between the quantity of the reflected light in a portion having the above pit formed therein and the quantity of the reflected light in a portion having no pit formed therein is detected and converted into an electric signal, thereby to effect reading.

In the conventional optical recording medium, however, the above protection layer has been formed by applying a resin material such as an ultraviolet ray curing (or hardening) resin and a solvent type resin on the light reflection layer and hardening the resultant coating, and the resultant protection film only has a thickness of about 5 to 15 $\mu$m. Accordingly, when such a protection layer is disposed on the light reflection layer by itself, the protection layer can easily peeled or separated from the light reflection layer when an external force such as scratching with a nail of a user. As a result, in the conventional optical recording medium, there is posed a problem such that the light absorbing layer and the light reflection layer are not sufficiently protected from the external force as described above. In addition, when the protection layer is caused to have a larger thickness, the above problem has not been solved fundamentally or drastically.

SUMMARY OF THE INVENTION

A principal object of the present invention is, in view of the above problems encountered in the prior art, to provide an optical recording medium wherein the protection layer thereof is not peeled or separated from the other layer constituting the optical recording medium and the light absorbing Layer and the light reflection layer are always protected stably even when an external force is applied to the optical recording medium, and therefore the optical recording medium is easy to be handled.

According to the present invention, there is provided an optical recording medium comprising: a light transparent substrate, a light absorbing layer disposed on the light transparent substrate, a light reflection layer disposed on the light absorbing layer, and a protection layer disposed on the light reflection layer, wherein a cushion material layer is disposed at least above the light reflection layer by the medium of the protection layer, and a protection plate is disposed on the cushion material layer.

In the optical recording medium according to the present invention having the above structure, an external force which can be applied to the protection plate side of the optical recording medium is lessened or cushioned by the protection plate and is further lessened by the cushion material layer disposed between the above protection plate and the protection layer. As a result, the protection layer may be prevented from being peeled or separated from the other layer constituting the optical recording medium even when an external force is applied thereto, whereby the light absorbing layer and the light reflection layer are stably protected from such an external force.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1:
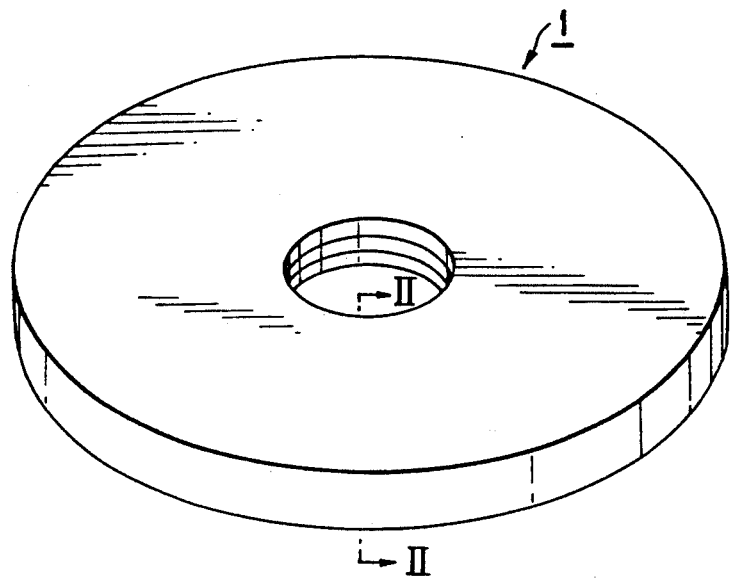
FIG. 1 is a schematic perspective view showing an embodiment of the optical recording medium according to the present invention.
Figure 2:
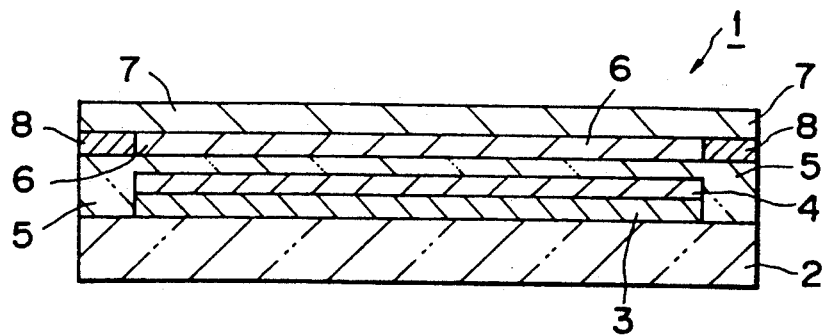
FIG. 2 is a schematic sectional view showing the above embodiment of the optical recording medium according to the present invention.

FIG. I is a schematic perspective view showing an embodiment of the optical recording medium according to the present invention. FIG. 2 is an enlarged sectional view taken along the line II—II in FIG. 1.

Referring to the Figure, the optical recording medium 1 according to the present invention comprises a light transparent substrate 2 or a substrate having a light transmission, a light absorbing layer 3 disposed on one surface side of the light transparent substrate 2, a light reflection layer 4 disposed on the light absorbing layer 3, and a protection layer 5 disposed on the light reflection layer 4. In addition, the optical recording medium 1 according to the present invention is characterized in that a protection plate 7 is disposed on the above protection layer 5 by the medium of a cushion material layer 6. The cushion material layer 6 and the protection plate 7 are disposed for the purpose of preventing the protection layer 5 from being peeled or separated from the light reflection layer 4. For such a purpose, the cushion material layer 6 is disposed so that it is positioned at least above the light reflection layer 4. When such a structure is adopted, a boundary (or interface) between the light reflection layer 4 and the protection layer 5, which only provides a weak adhesion force, can effectively be prevented from being affected by the external force. In this embodiment, the protection plate 7 is in the form of a circular plate member corresponding to the light transparent substrate 2, and has a structure wherein a center hole is provided in the central portion thereof. The protection plate 7 is fixed to the protection layer 5 by the medium of an adhesive material layer 8 with respect to a region other than the region wherein the light absorbing layer 3 is disposed. The reason for this is that in such a region, the protection layer 5 is directly fixed to the light transparent substrate 2 and the peeling or separation thereof is less liable to occur (or hardly occurs).

Figure 3:
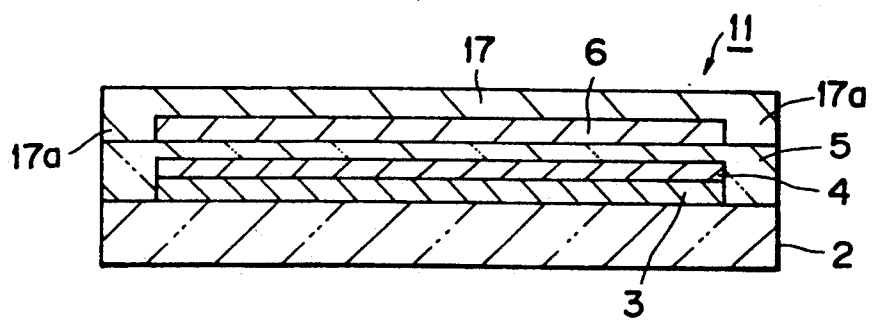
FIG. 3 is a schematic sectional view showing another embodiment of the optical recording medium according to the present invention in the same manner as in the case of FIG. 2.

FIG. 3 is an enlarged view showing another embodiment of the optical recording medium according to the present invention, which corresponds to FIG. 2. The optical recording medium 11 shown in FIG. 3 has the same structure as the optical recording medium 1 shown in FIG. 2 except that the protection plate 17 shown in FIG. 3 has a different structure from that of the protection plate 7 shown in FIG 2. More specifically, the protection plate 17 is in the form of a circular plate member corresponding to the light transparent substrate 2 and has a structure wherein a center hole is provided in the central portion thereof. The protection plate 17 is fixed to the protection layer 5 by the medium of a flange 17a.

The light transparent substrate 2 may for example be formed by use of an injection molding method using a transparent resin such as a polycarbonate resin (PC), and a polymethylmethacrylate resin (PMMA). Such a light transparent substrate 2 may preferably have a thickness of about 1.0 to 1.5 mm. In a predetermined region of the light transparent substrate 2 on the side on which the light absorbing layer 3 is to be formed, a spiral groove is formed although such a spiral groove is not shown in the Figure.

The light absorbing layer 3 to be formed on the light transparent substrate 2 may preferably comprise a thin film comprising an organic coloring matter (or organic colorant). The organic coloring matter to be used for such a purpose may be one selected from various coloring matters such as a cyanine type coloring matter and a phthalocyanine type coloring matter. For example, the above cyanine type coloring matter may be a cyanine type coloring matter represented by the following general formula.

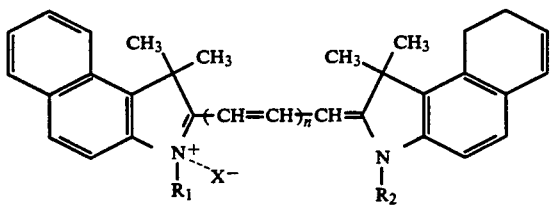

In the above general formula, $R_1$ and $R_2$ respectively denote an alkyl group having 3 to 8 carbon atoms (more preferably 3 to 5 carbon atoms), and $X^-$ denotes a counter ion such as $ClO_4^-$, and $I^-$.

The light absorbing layer 3 comprising an organic coloring matter may for example be formed by use of a known coating method such as a spin coating method. The thus formed light absorbing layer 3 may preferably have a thickness of about 20 to 2000 nm. In the above coating operation, it is possible to use an appropriate solvent which is selected from various known solvents in accordance with the organic coloring matter used for the above purpose. Specific examples thereof may include: diacetone alcohol, ethyl cellosolve, methyl cellosolve, isophorone, methanol, tetrafluoropropanol, etc.

On the above light absorbing layer 3, the light reflection layer 4 is formed. The light reflection layer 4 may comprise a metal such as Au, Ag, Cu, and Al. Such a light reflection layer 4 may preferably be formed by use of one selected from various vacuum film forming (or vacuum vapor deposition) processes and plating processes such as vacuum evaporation, sputtering, and ion plating. The thus formed light reflection layer 4 may preferably have a thickness of about 0.02 to 2.0 $\mu$m.

The protection layer 5 is disposed for the purpose of protecting the light absorbing layer 3 and the light reflection layer 4, and may generally be formed by applying a light curing (or hardening) resin (or a photo setting resin) on a predetermined surface and hardening the resultant coating. The protection layer 5 may also be formed by use of another resin such as an epoxy resin, an acrylic resin, a silicone resin, and a urethane resin. The protection layer 5 may be formed by use of a known coating method such as the spin coating method and may preferably have a thickness of about 0.1 to 100 $\mu$m.

The cushion material layer 6 may be formed by use of a known cushion material such as felt. In general, the cushion material layer 6 may preferably have a thickness of about 100 to 500 $\mu$m. Such a cushion material may be disposed on a predetermined position of the protection layer 5 as such, and the protection plate may be disposed on the cushion material layer 6. It is also possible to temporarily (or preliminarily) bond the cushion material to a predetermined position of the protection layer 5, or to dispose the protection plate on (or above) he protection layer in a state where the cushion material is temporarily bonded to the protection plate.

The protection plate 7 and/or 17 may be formed by use of a plate comprising paper material, a resin such as an acrylic resin, a polycarbonate resin, a polypropylene resin, and a nitrocellulose resin, etc.. The thickness of the protection plate 7 and/or 17 may appropriately be determined in accordance with the material to be used for such a purpose. In general, the protection plate may preferably have a thickness of about 100 to 500 $\mu$m. The total thickness of the protection plate and the cushion material layer 6 as described above may preferably be less than 1 mm.

In addition, it is also possible to dispose an intermediate layer between the light absorbing layer 3 and the light transparent substrate 2. Such an intermediate layer may have a function of protecting the substrate 2 from a solvent to be used at the time of the formation of the light absorbing layer 3. It is also possible to dispose an intermediate layer between the light absorbing layer 3 and the light reflection layer 4 for the purpose of improving the light absorption efficiency.

As described hereinabove, in the optical recording medium according to the present invention having the above structure, an external force which can be applied to the protection plate side of the optical recording medium is lessened or cushioned by the protection plate and is further lessened by the cushion material layer disposed between the above protection plate and the protection layer. As a result, the protection layer may be prevented from being peeled or separated from the other layer constituting the optical recording medium even when an external force is applied thereto, whereby the light absorbing layer and the light reflection layer are stably protected from such an external force.

Hereinbelow, the present invention will be described in more detail with reference to specific Examples.

EXAMPLE

A polycarbonate substrate as a light transparent substrate having a diameter of 120 mm, a thickness of 1.2 mm and a diameter of a center hole of 15 mm was molded by use of an injection molding process so that the resultant substrate had a spiral groove having a groove pitch of 1.6 μm, a groove width of 0.6 μm, and a groove depth of 600 Å.

Then, a cyanine type coloring matter represented by the following general formula was dissolved in ethyl cellosolve (concentration of coloring matter 30 mg/ml) thereby to prepare a coating liquid. The thus prepared coating liquid was applied onto a surface of the polycarbonate substrate described above on which the spiral groove had been formed, by spin coating method thereby to form a light absorbing layer having a thickness of 100 nm.

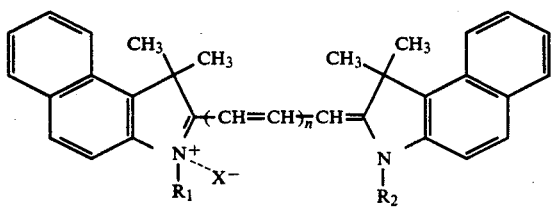

In the above general formula, $R_1$ and $R_2$ denote n-$C_3H_7$ and n-$C_4H_9$, respectively, and $X^-$ denotes $ClO_4^-$.

Thereafter, a light reflection layer having a thickness of 2000 Å and comprising Au was disposed on the light absorbing layer formed above by use of a vacuum evaporation method.

Further, a light curing resin (trade name: SD17, mfd. by Dainippon Ink K. K.) was applied onto the light reflection layer formed above and the resultant coating was cured (or hardened) thereby to form a protection layer which had a thickness of about 10 μm and covered the light absorbing layer and the light reflection layer.

Then, there was prepared a felt material having a thickness of about 500 μm, diameter of 118 mm and a diameter of a center hole of 44 mm, and the resultant felt material was disposed on the protection layer formed above so that it as disposed above the light reflection layer. Thereafter, a protection plate comprising an acrylic resin and having a thickness of about 100 μm, a diameter of 120 mm, and a diameter of a center hole of 40 mm was disposed opposite to the protection layer by the medium of the felt material as described above. Then, the protection plate and the protection layer were fixed to each other by use of an acrylic type adhesive agent in an inner peripheral portion and an outer peripheral portion thereof, thereby to provide an optical recording medium (Example) according to the present invention.

For the purpose of comparison with the optical recording meidum as described above, there was prepared another optical recording medium (Comparative Example) in the same manner as in the case of the above Example except that the felt material layer and the protection plate were not disposed.

Then, the following scratch resistance test (or anti scratch test) was conducted with respect to the optical recording media of Example and Comparative Example prepared above.

SCRATCH RESISTANCE TEST

The hardness of the above optical recording media were evaluated according to a pencil hardness test (i.e., hardness test using a pencil). When a pencil of 2H was used, with respect to the optical recording medium of Comparative Example wherein the protection plate had not been provided, the protection layer was peeled. However, with respect to the optical recording medium of Example wherein the protection plate had been provided, the protection plate was prevented from being damaged and the protection film was also prevented from being damaged even when a pencil of 3H having a higher hardness was used.

As a result, it was confirmed that the optical recording medium according to the present invention had a sufficient scratch resistance (or anti scratch property).

What is claimed is:

1. An optical recording medium, comprising: a light transparent substrate, a light absorbing layer disposed on the light transparent substrate a light reflection layer disposed on the light absorbing layer, and a protection layer disposed on the light reflection layer,
    wherein a cushion material layer is disposed at least above the light reflection layer by the medium of the protection layer, and a protection plate is disposed on the cushion material layer.

2. An optical recording medium according to claim 1, wherein the light absorbing layer comprises an organic coloring matter.

3. An optical recording medium according to claim 2, wherein the organic coloring matter comprises a cyanine type coloring matter.

4. An optical recording medium according to claim 3, wherein the cyanine type coloring matter comprises a cyanine type coloring matter represented by the following general formula:

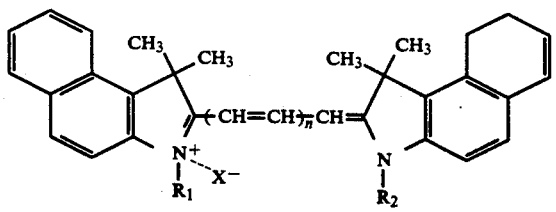

wherein $R_1$ and $R_2$ respectively represent an alkyl group having 3 to 8 carbon atoms and $X^-$ represents a counter ion.

5. An optical recording medium according to claim 1, wherein the light absorbing layer has a thickness of 20 to 2000 nm.

6. An optical recording medium according to claim 1, wherein the light reflection layer has a thickness of 0.02 to 2.0 μm.

7. An optical recording medium according to claim 1, wherein the protection layer has been formed by hardening a light curing resin and has a thickness of 0.1 to 100 μm.

8. An optical recording medium according to claim 1, wherein the cushion material layer has a thickness of 100 to 500 μm.

9. An optical recording medium according to claim 8, wherein the cushion material layer comprises a felt layer.

10. An optical recording medium according to claim 1, wherein the protection plate has a circular shape corresponding to the shape of the light transparent substrate and has a center hole in the central portion thereof.

11. An optical recording medium according to claim 1, wherein the protection plate is fixed to the protection layer by an adhesive material layer in a region wherein the light absorbing layer is not present.

12. An optical recording medium according to claim 1, wherein the protection plate has a flange in a peripheral portion thereof, and is fixed to the protection layer by the means of the flange.

13. An optical recording medium according to claim 1, wherein the protection plate has a thickness of 100 to 500 μm.

14. An optical recording medium according to claim 1, wherein the protection plate comprises a resin plate.

15. An optical recording medium according to claim 14, wherein the resin plate comprises a resin selected from the group consisting of an acrylic resin, a polycarbonate resin, a polypropylene resin and a nitrocellulose resin.

16. An optical recording medium according to claim 1, wherein the protection plate comprises a paper material.

17. An optical recording medium according to claim 1, wherein the total thickness of the cushion layer and the protection plate is smaller than 1 mm.

18. An optical recording medium according to claim 4, wherein $R_1$ and $R_2$ respectively represent an alkyl group having 3 to 5 carbon atoms and $X^-$ represents a counter ion selected from $ClO_4^-$ or $I^{31}$.

* * * * *